(12) United States Patent
Roell et al.

(10) Patent No.: US 12,434,728 B2
(45) Date of Patent: Oct. 7, 2025

(54) VEHICLE OPERATOR DROWSINESS ALERT

(71) Applicant: GM GLOBAL TECHNOLOGY OPERATIONS LLC, Detroit, MI (US)

(72) Inventors: James V. Roell, Clarkston, MI (US); Maureen E. August, Grosse Pointe Woods, MI (US); George R. O'Sullivan, Chicago, IL (US)

(73) Assignee: GM Global Technology Operations LLC, Detroit, MI (US)

( * ) Notice: Subject to any disclaimer, the term of this patent is extended or adjusted under 35 U.S.C. 154(b) by 147 days.

(21) Appl. No.: 18/303,602

(22) Filed: Apr. 20, 2023

(65) Prior Publication Data

US 2024/0351601 A1 Oct. 24, 2024

(51) Int. Cl.
*B60W 50/14* (2020.01)
*B60W 40/08* (2012.01)

(52) U.S. Cl.
CPC ............ *B60W 50/14* (2013.01); *B60W 40/08* (2013.01); *B60W 2050/143* (2013.01); *B60W 2050/146* (2013.01); *B60W 2540/10* (2013.01); *B60W 2540/12* (2013.01); *B60W 2540/229* (2020.02); *B60W 2540/26* (2013.01)

(58) Field of Classification Search
CPC ............... B60W 50/14; B60W 40/08; B60W 2540/229; B60W 2050/143; B60W 2050/146; B60W 2540/10; B60W 2540/12; B60W 2540/26; B60W 40/09; B60W 2040/0809; B60W 2040/0827; G08B 21/06; G08B 21/00; G08B 21/02; B60K 28/06; B60Q 9/00; B60R 11/04; G06K 9/00335; G06K 9/00845; G06V 20/597; G06V 40/20

See application file for complete search history.

(56) References Cited

U.S. PATENT DOCUMENTS

| 11,587,441 | B1* | 2/2023 | Cheng | G07C 5/085 |
| 2004/0239509 | A1* | 12/2004 | Kisacanin | G01S 13/867 |
| | | | | 340/575 |
| 2015/0314681 | A1* | 11/2015 | Riley, Sr. | A61B 5/7455 |
| | | | | 340/576 |
| 2018/0365961 | A1* | 12/2018 | Katsuhara | G08B 21/06 |
| 2020/0079320 | A1* | 3/2020 | Lacoss-Arnold | B60R 25/2081 |

* cited by examiner

*Primary Examiner* — Brian A Zimmerman
*Assistant Examiner* — Anthony D Afrifa-Kyei
(74) *Attorney, Agent, or Firm* — Quinn IP Law

(57) ABSTRACT

A method for controlling an operator drowsiness alert system for a vehicle reacts to a sensed or calculated level of drowsiness of the vehicle operator. The method includes entering a first drowsiness alert state associated with a first operator drowsiness alert if the sensed or calculated level of drowsiness is above a first predetermined level for a first predetermined time, where the first predetermined time is greater than zero. Additionally, the method includes transitioning from the first drowsiness alert state to a second drowsiness alert state associated with a second operator drowsiness alert if the sensed or calculated level of drowsiness is above a second predetermined level for a second predetermined time, where the second predetermined time is greater than zero.

20 Claims, 3 Drawing Sheets

VEHICLE OPERATOR DROWSINESS ALERT

INTRODUCTION

Long drives and late-night driving, as well as driving by people who may be sleep-deprived from time to time for various reasons, may raise issues associated with driver drowsiness. A drowsy driver may be less attentive to her or his driving tasks than a driver who is not drowsy, reducing the control the driver has over the vehicle. In the extreme, if a driver falls completely asleep, he or she may fully lose control of the vehicle.

A driver alert system that warns the driver of her or his drowsiness but does so in an effective but not overly obtrusive manner may therefore provide significant advantages. Further, while likely to be useful and valuable, a sensor or a system that detects or estimates a driver's drowsiness is not likely to be perfect in performing its task; there may from time to time be readings that are suspect of being false. A driver drowsiness alert system that helps discriminate among likely true and possibly false measurements or estimates of driver drowsiness and using the measurements or estimates effectively may be advantageous. Finally, a driver drowsiness alert system that in addition to providing driver alerts may provide countermeasures to actively attempt to keep the driver alert and awake may provide significant advantages.

SUMMARY

Disclosed herein are methods and accompanying systems for providing drowsiness alerts to operators of vehicles, such as, in the examples disclosed herein, drivers of automobiles. The methods and systems provide alerts to the driver in response to measured or estimated levels of the driver's drowsiness. The alerts are designed to be effective yet not overly obtrusive. Features disclosed herein also help discriminate with respective to possibly-erroneous measurements or estimates of drowsiness as well as providing countermeasures in an attempt to help keep the driver alert and awake.

In a particular embodiment, disclosed herein is a method for controlling an operator drowsiness alert system for a vehicle, the method reacting to a sensed or calculated level of drowsiness of an operator of a vehicle. The method includes entering a first drowsiness alert state associated with a first operator drowsiness alert if the sensed or calculated level of drowsiness is above a first predetermined level for a first predetermined time, wherein the first predetermined time is greater than zero. The method additionally includes transitioning from the first drowsiness alert state to a second drowsiness alert state associated with a second operator drowsiness alert if the sensed or calculated level of drowsiness is above a second predetermined level for a second predetermined time, where the second predetermined time is greater than zero.

In a variation, the method may further include providing the first operator drowsiness alert after a predetermined time in the first drowsiness alert state, the predetermined time in the first drowsiness alert state being greater than zero.

Additionally, the method may include repeating the first operator drowsiness alert if the method remains in the first drowsiness alert state for more than an additional predetermined time, the additional predetermined time in the first drowsiness alert state being greater than zero.

Further yet, the method may include providing the second operator drowsiness alert after a predetermined time in the second drowsiness alert state, the predetermined time in the second drowsiness alert state being greater than zero.

In another disclosed variation, notwithstanding any other conditions being met for providing the first operator drowsiness alert, the first operator drowsiness alert is suppressed until the expiration of an alert suppression time, the alert suppression time being a predetermined time after one or more of the operator powering up the vehicle, the vehicle being started, and the operator beginning to operate the vehicle.

As another variation, notwithstanding any other conditions being met for providing the first operator drowsiness alert, the first operator drowsiness alert is suppressed based on one or more of operator brake pedal actuation, operator accelerator pedal actuation, vehicle longitudinal acceleration, and vehicle lateral acceleration.

The method may further include providing an operator drowsiness mitigation while in the second drowsiness alert state. The operator drowsiness mitigation may be provided after the second operator drowsiness alert. The mitigation may include a textual message on a driver information center of the vehicle or an audible voice message and the message may offer the vehicle operator one or more of making a telephone call, playing music, beginning a conversation with a telematics service representative, and navigating to a point of interest.

Additionally, the method may include, while in the second drowsiness alert state, moving to the first drowsiness alert state if the sensed or calculated level of drowsiness is below a predetermined level for a predetermined period of time. Further, the first drowsiness alert may be suppressed if the first drowsiness alert state was entered from the second drowsiness alert state.

In a variation of the method disclosed herein, if the vehicle operator is not below a predetermined age, the operator may be allowed to elect to turn off the system or suppress alerts although the vehicle is otherwise operating.

The present disclosure also includes a drowsiness alert system for a vehicle, the system including one or more controllers collectively programmed with the following instructions: enter a first drowsiness alert state associated with a first operator drowsiness alert if a sensed or calculated level of drowsiness of a vehicle operator is above a first predetermined level for a first predetermined time, where the predetermined time is greater than zero; and transition from the first drowsiness alert state to a second drowsiness alert state associated with a second operator drowsiness alert if the sensed or calculated level of drowsiness is above a second predetermined level for a second predetermined time, where the second predetermined time is greater than zero.

In a variation, the one or more controllers may be further collectively programmed to provide the first operator drowsiness alert after a predetermined time in the first drowsiness alert state, the predetermined time in the first drowsiness alert state being greater than zero.

Additionally, the one or more controllers of the system may be further collectively programmed with the following instruction: notwithstanding any other conditions being met for providing the first operator drowsiness alert, suppress the alert for an alert suppression time, the alert suppression time being a first predetermined time after one or more of the operator powering up the vehicle, the vehicle being started, and the operator beginning to operate the vehicle.

In still another variation of the operator drowsiness alert system disclosed herein, the one or more controllers are further collectively programmed with the following instruction: notwithstanding any other conditions being met for providing the first operator drowsiness alert, suppress the first operator drowsiness alert based one or more of operator brake pedal actuation, operator accelerator pedal actuation, vehicle longitudinal acceleration and vehicle lateral acceleration.

In an additional example disclosed herein, the one or more controllers may be further collectively programmed to provide an operator drowsiness mitigation while in the second drowsiness alert state, where the mitigation includes a textual message on a driver information center of the vehicle or an audible voice message and, in a variation, the message offers the operator one or more of making a telephone call, playing music, beginning a conversation with a telematics service representative, and navigating to a point of interest.

By way of further example, the one or more controllers in the drowsiness alert system are further collectively programmed with the following instructions: while in the second drowsiness alert state, move to the first drowsiness alert state if the sensed or detected level of drowsiness is below a predetermined level for a predetermined time and suppress the first drowsiness alert if the first drowsiness alert state was entered from the second drowsiness alert state.

This specification further discloses a method for controlling an operator drowsiness alert system, the method reacting to a sensed or calculated level of drowsiness of an operator of a vehicle. The method includes entering a first drowsiness alert state associated with a first operator drowsiness alert if the sensed or calculated level of drowsiness is above a first predetermined level for a predetermined time, where the predetermined time is greater than zero. The method additionally includes transitioning from the first drowsiness alert state to a second drowsiness alert state associated with a second operator drowsiness alert if the sensed or calculated level of drowsiness is above a second predetermined level for a predetermined time. Yet further, the method includes providing the first operator drowsiness alert after a predetermined time in the first drowsiness alert state, the predetermined time in the first drowsiness alert state being greater than zero.

The above summary does not represent every embodiment or every aspect of this disclosure. Other possible features and advantages will be readily apparent from the following detailed description of the embodiments for carrying out the disclosure when taken in connection with the accompanying drawings and appended claims. Further, combinations and subcombinations of elements described in this disclosure are expressly included in this disclosure.

DETAILED DESCRIPTION

The "Karolinska Sleepiness Scale," a nine-point numeric scale reflecting a person's drowsiness, rates that drowsiness on a scale that includes 1 (less drowsy), 5 (neither alert nor drowsy), and 9 (very drowsy). The Karolinska Sleepiness Scale was published in Åkerstedt and Gillberg, "Subjective and Objective Sleepiness in the Active Individual," 52 *International Journal of Neuroscience*, 1-2, pp. 29-37 (1990).

There are various ways of measuring or estimating a vehicle operator's drowsiness and reporting it on the Karolinska Sleepiness Scale or another graduated scale. For instance, the Swedish company Smart Eye markets an artificial intelligence product that uses various inputs from a vehicle operator, such as observed eye, head, and face movements, to estimate a vehicle operator's drowsiness on a graduated scale. Other methods for sensing vehicle operator drowsiness include sensing the position of the vehicle to infer driver drowsiness (so-called "Current Car Position" or "CCP") and assessing operator drowsiness based on the operator's physical behaviors and mannerisms (so-called "Observer Rating of Drowsiness" or "ORD").

After measuring or estimating the drowsiness of a vehicle operator, such as the driver of a motor vehicle, what remains is finding an effective way to alert the operator of her or his drowsiness. There may be a conflict between alerting the driver of her or his drowsiness frequently enough to be effective, versus alerting the driver too frequently, with alerts then becoming an annoyance. In the extreme, if any alerts are provided in too obtrusive a manner, the driver may simply elect to turn off the system, which will defeat the purpose of having a driver drowsiness feature on the vehicle in the first place.

Figure 1:
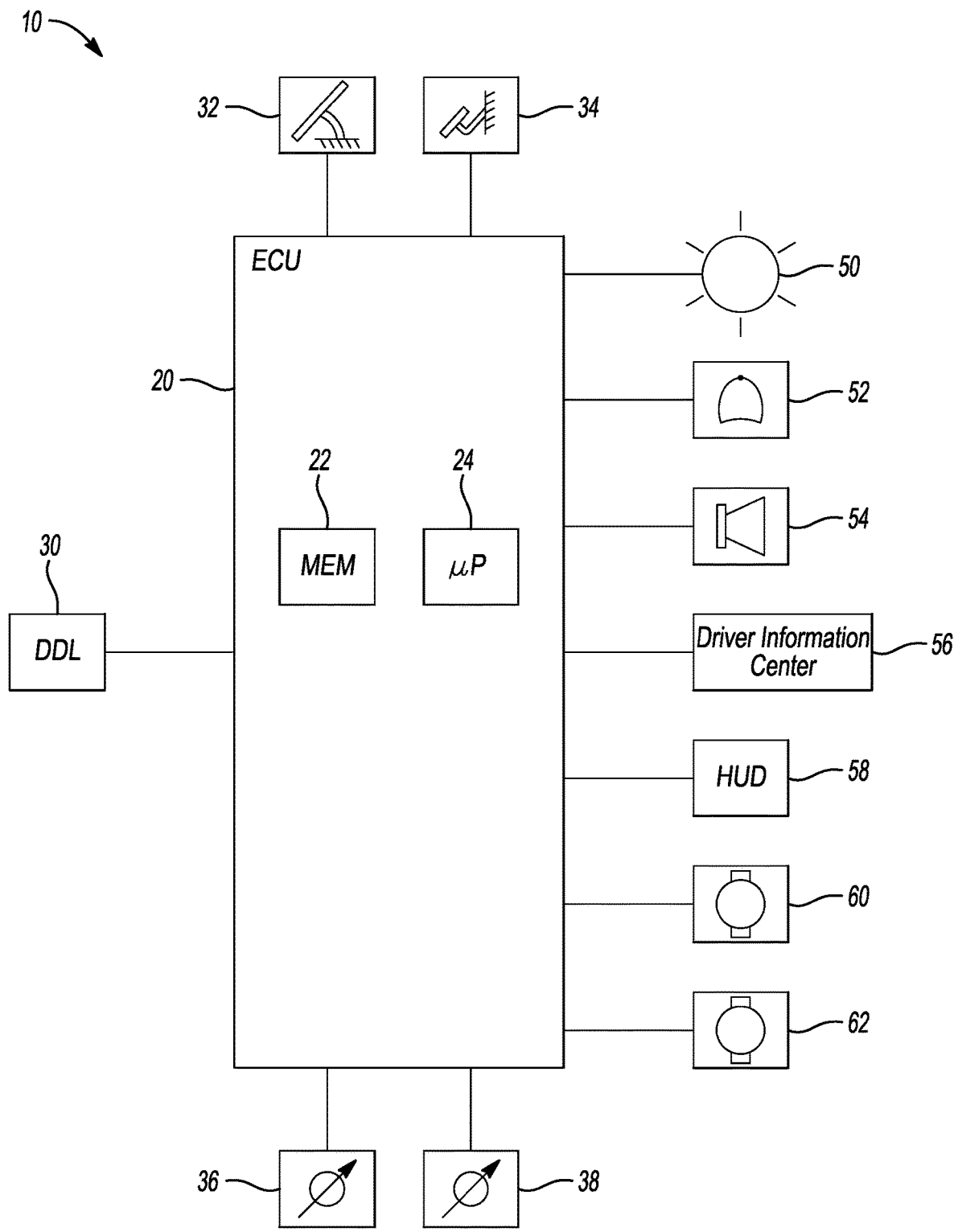
FIG. 1 is a diagram schematically illustrating an operator drowsiness alert system 10 according to a representative example of the present disclosure.

Referring to the drawings, FIG. 1 schematically depicts a drowsiness alert system 10 for an operator of a vehicle, such as the driver of a motor vehicle. System 10 has an electronic control unit ("ECU") 20. ECU 20 has the electronic resources (e.g., memory 22, microprocessor 24, inputs, outputs, software and the like) sufficient to perform the tasks ascribed to ECU 20 in this disclosure. An input to ECU 20 is a driver drowsiness level ("DDL") measurement, calculation, or estimate 30. Such DDL measurement, calculation, or estimate may itself be a calculation provided by an ECU. Alternatively, the DDL may be provided from a dedicated DDL sensor. DDL is a driver drowsiness level having graduations to distinguish among higher levels of driver drowsiness and lower levels of driver drowsiness. The graduations may take the form of, for instance, the Karolinska Sleepiness Scale of 1-9, with 1 being the lowest level of measured, calculated, or estimated driver drowsiness and 9 being the highest level. Other alternative measurements, calculations, or estimates of the driver's drowsiness that distinguishes among lower and higher levels of driver drowsiness may alternatively be used in the presently disclosed drowsiness alert system and method.

Inputs to ECU 20 may include an acceleration pedal sensor 32, which senses whether and to the extent to which the vehicle driver is pressing on an accelerator pedal of the vehicle. Inputs to ECU 20 may also include a brake pedal position sensor 34, which senses whether and to the extent the driver is pressing on a brake pedal of the vehicle. Further, ECU 20 may have as an input a lateral accelerometer 36, which is often provided on motor vehicles and which measures a lateral acceleration of the vehicle. Also, sensor 38 indicative of the speed and/or longitudinal acceleration of the vehicle may also be included; if sensor 38 is a vehicle speed sensor, then longitudinal acceleration may be calculated as a rate of change of the vehicle speed.

It should be noted at this point that modern motor vehicles often have distributed computing, with controllers that are extensively networked with data buses. Therefore, the functions described in this disclosure may be performed or distributed between one or more ECUs, and inputs/outputs may be connected to any of them, with data and commands being shared among the ECUs. As such, sensors 32, 34, 36, 38 may also be inputs to one or more other ECUs, which may provide data from those sensors to ECU 20 via data buses that communicatively couples the various ECUs on the vehicle.

Outputs from ECU 20 may include one or more telltale lamps 50 on an instrument panel of the vehicle, one or more chimes 52, one or more speakers 54, one or more driver information centers 56, one or more haptic generators 60, and one or more active seatbelt retractors 62. Driver information centers 56 may provide reconfigurable messages to the driver of the vehicle, for instance via a video or dot-matrix display. The visual indictors (lamps 50 and driver information centers 56) may also be projected onto a head's up display ("HUD") 58, if the vehicle is so configured. Lamps 50, chimes 52, speakers 54, and driver information centers 56 are devices through which drowsiness alerts may be provided to the driver. Some or all of these devices may be connected to other ECUs on the vehicle than ECU 20, owing to the networked nature of many motor vehicles, and may be commanded by such other ECUs.

Figure 2:
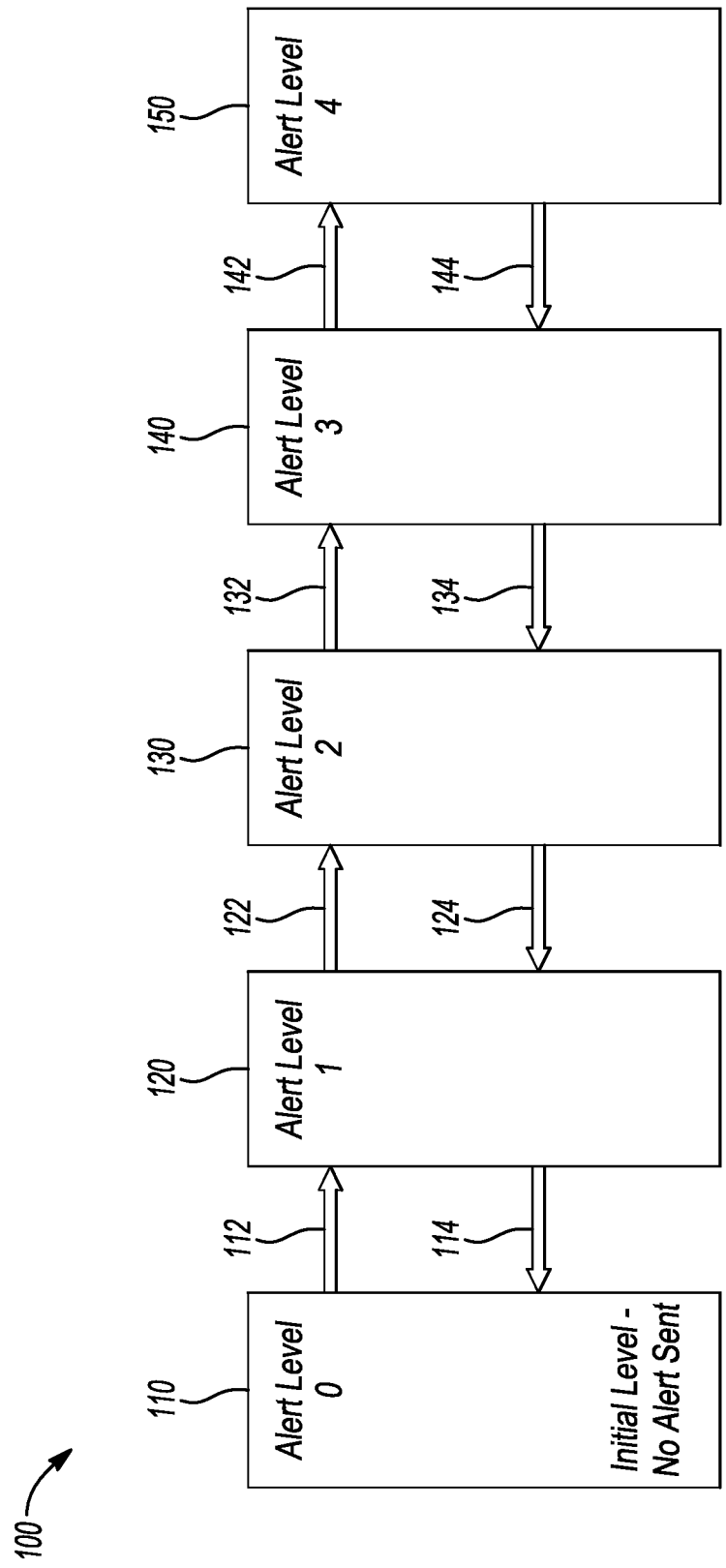
FIG. 2 is a state transition diagram 100 illustrating the states and transitions therebetween of the example operator drowsiness alert system 10.

Referring to FIG. 2, state transition diagram 100 shows the states and transition conditions therebetween for the example driver alert system and method disclosed herein.

In the example provided by this disclosure, there are five states, or Alert Levels, as shown in FIG. 2. Alert Level 0 110 is an initial state in which no drowsiness alert is provided to the driver. Alert Level 1 120, Alert Level 2 130, Alert Level 3 140, and Alert Level 4 150 are states in which, under the appropriate conditions while the system is in those states, and so long as no alert suppression condition exists, a drowsiness alert is provided to the driver of the vehicle.

Transition 112 from Alert Level 0 110 to Alert Level 1 120 may occur under the following conditions while the system is in Alert Level 0:

| Driver Drowsiness Level (DDL) | Example Time at DDL |
| --- | --- |
| 7 | 480 seconds |
| 8, if transitioning directly from DDL 6 | 180 seconds |
| 8, if transitioning directly from DDL 7 | 135 seconds |
| 9, if transitioning directly from DDL 6 | 135 seconds |
| 9, if transitioning directly from DDL 7 | 90 seconds |
| 9, if transitioning directly from DDL 8 | 45 seconds |

As shown above, at DDL 7, the transition from Alert Level 0 110 to Alert Level 1 120 takes place in 480 seconds. However, if the DDL is higher, say DDL 8 or DDL 9, the transition into Alert Level 1 120 occurs more quickly. Further, with reference to the three rows above relating to DDL 9, it is apparent that the transition from Alert Level 0 110 to Alert Level 1 120 may occur more quickly if the DDL was most recently DDL 8 than if it was most recently at a lower DDL, say, DDL 6. This is because an estimate or measurement of DDL 9 may be seen as more "believable" if the DDL was most recently DDL 8, so the DDL 9 estimate or measurement may be treated as being of higher confidence. A DDL 9 when the DDL was most recently DDL 6 might be less "believable", given the very sudden jump in DDL level, so a longer waiting period (135 seconds, as shown above) is applied before entering Alert Level 1 120. This is in an effort to provide driver alerts when there is high confidence that they are warranted and to avoid false alarms that may unnecessarily annoy the driver or reduce the driver's confidence in the system.

After entering Alert Level 1 120, the system has a waiting period of, for instance, 30 minutes, prior to providing an alert to the driver. Then, the alert is provided to the driver and will, in this example system, repeat every 30 minutes while the system remains in Alert Level 1 120.

The alert provided in Alert Level 1 120 may take a number of forms. By way of example, it may be through illumination of a lamp 50. It may be through activating a chime 52. It may be through a textual message provided on a driver information center 56 of the vehicle, warning the driver of her or his drowsy state. It may also be through a synthesized voice provided via a speaker 54, also warning the driver of his or her drowsy state. Alternatively, the alert may be a vibrating haptic alert through a haptic generator 60 included, for example, in the driver seat or the steering wheel of the vehicle. Yet further, the alert may be via one or more "tugs" of an active seatbelt retractor 62 in the driver's seat, if the vehicle is equipped with such a retractor. The alert may also be a combination of the foregoing, such as a chime accompanying a driver information center message or accompanying illumination of a lamp 50.

Transition 122 from Alert Level 1 120 to Alert Level 2 130 may occur under the following conditions while the system is in Alert Level 1 120:

| Driver Drowsiness Level (DDL) | Example Time at DDL Level |
| --- | --- |
| >=7 | 480 seconds |
| >=8 | 60 seconds |
| 9 | 20 seconds |

As is apparent from the above, transition from Alert Level 1 120 to Alert Level 2 130 (that is, a transition from the lower alert level to the higher alert level) occurs more quickly if the DDL (the measured or sensed level of drowsiness) is higher, owing to the potential higher urgency of the drowsiness measurement or estimate.

After entering Alert Level 2 130, the system has a waiting period of, for instance, 10 minutes, prior to providing an alert to the driver. Then, the alert is provided to the driver and will repeat every 10 minutes while the system remains in Alert Level 2 130.

The alert provided in Alert Level 2 130 may take a number of forms. It may be through illumination of a lamp 50. It may be through activating a chime 52. It may be through a textual message provided on a driver information center 56 of the vehicle. It may be through a synthesized voice provided via a speaker 54. However, the form of the alert is preferably different than the alert provided in Alert Level 1 120. For instance, the alert may be audible (e.g., a chime) in Alert Level 2 130 while the alert is visual (e.g., an illuminated lamp) in Alert Level 1 120. Or the alerts provided might both be via the same medium (e.g., an illuminated lamp 50) but the lamp may be solidly lit in Alert Level 1 120 and flashing in Alert Level 2 130. Alternatively, the lamp may be one color in Alert Level 1 120 and a different color in Alert Level 2 130 (e.g., yellow in Alert Level 1 120 and red in Alert Level 2 130). Alternatively again, the lamp 50 may be flashing in both alert levels but flash at different rates (e.g., more slowly in Alert Level 1 120 and more quickly in Alert Level 2 130) to indicate a higher level of alert in Alert Level 2 130 than in Alert Level 1 120. Alternatively yet again, the alert in Alert Level 1 120 may be alphanumeric text provided on a reconfigurable display on a driver information center 56 and may be different alphanumeric text provided on the reconfigurable display in Alert Level 2 130. As a further example, the alert provided in Alert Level 2 130 may be a chime, provided at a different repetition rate or volume than at other Alert Levels.

Transition 132 from Alert Level 2 130 to Alert Level 3 140 may occur if the following conditions occur while the system is in Alert Level 2 130:

| Driver Drowsiness Level (DDL) | Example Time at DDL |
| --- | --- |
| >=8 | 60 seconds |
| 9 | 20 seconds |

Again, transition from Alert Level 2 130 to Alert Level 3 140 occurs more quickly if the DDL is higher (that is, 9) versus lower (that is, 8).

When in Alert Level 3 140, there is, in this example disclosure, a waiting period before an alert is provided to the driver of the vehicle. That waiting period may be, for example, 5 minutes. Thereafter, while the system is in Alert Level 3 140, an alert is provided. The alert is preferably different than the alerts provided in Alert Level 1 120 and Alert Level 2 130 and may be, for instance, provided by lamp 50, chime 52, speaker 54, and/or driver information center 56.

Transition 142 from Alert Level 3 140 to Alert Level 4 150 may occur if the following conditions occur while the system is in Alert Level 3 140:

| Driver Drowsiness Level (DDL) | Example Time at DDL |
| --- | --- |
| >=8 | 60 seconds |
| 9 | 20 seconds |

When in Alert Level 4 150, the highest alert level, there are two different waiting and repetition times for providing alerts, depending upon the DDL, as shown here:

| Driver Drowsiness Level (DDL) | Wait Time for First Alert | Alert Repetition Rate |
| --- | --- | --- |
| 8 | 5 minutes | 5 minutes |
| 9 | 2 minutes | 5 minutes |

After the wait time and then at the repetition rate while the system is in Alert Level 4 150, an alert is provided. The alert is preferably different than the alerts provided in Alert Level 1 120, Alert Level 2 130, and Alert Level 3 140 and may be, for instance, provided by lamp 50, chime 52, speaker 54 and/or driver information center 56. The repetition rate for the alert in Alert Level 4 is shown as being five minutes whether in DDL 8 or DDL 9, though that time may be calibrated differently.

The alerts provided for use in Alert Level 1 120, Alert Level 2 130, Alert Level 3 140 and Alert Level 4 150 may be selected so that they are, in the judgment of the designers of the system, more "urgent" in a higher alert level than in the alert levels below it, with Alert Level 1 120 being the lowest alert level and Alert Level 4 150 being the highest alert level. As one example, an alert provided on driver information center 56 may be "DROWSY DRIVER ADVISORY-TAKE A REST BREAK?" (that is, an "advisory" that makes a suggestion for a rest break) in a lower (that is, less "urgent") alert level, but "DROWSY DRIVER ALERT-REST RECOMMENDED" (that is, an "alert" (rather than an advisory) that is accompanied by a "recommendation" rather than a suggestion) in a higher (that is, more "urgent") alert level. Additionally, a less "urgent" alert may by colored in, say, yellow, while a more "urgent" alert may be colored in, say, red. Or, a more "urgent" alert may be include a louder chime or one that chimes faster than a less "urgent" alert. Alternatively, a less "urgent" alert may be in the form of a static visual alert, such as lamp 50, while a more "urgent" alert may be in the form of a flashing visual alert. Still alternatively, a more "urgent" audible alert may be at a higher volume than a less "urgent" audible alert.

Figure 3A:
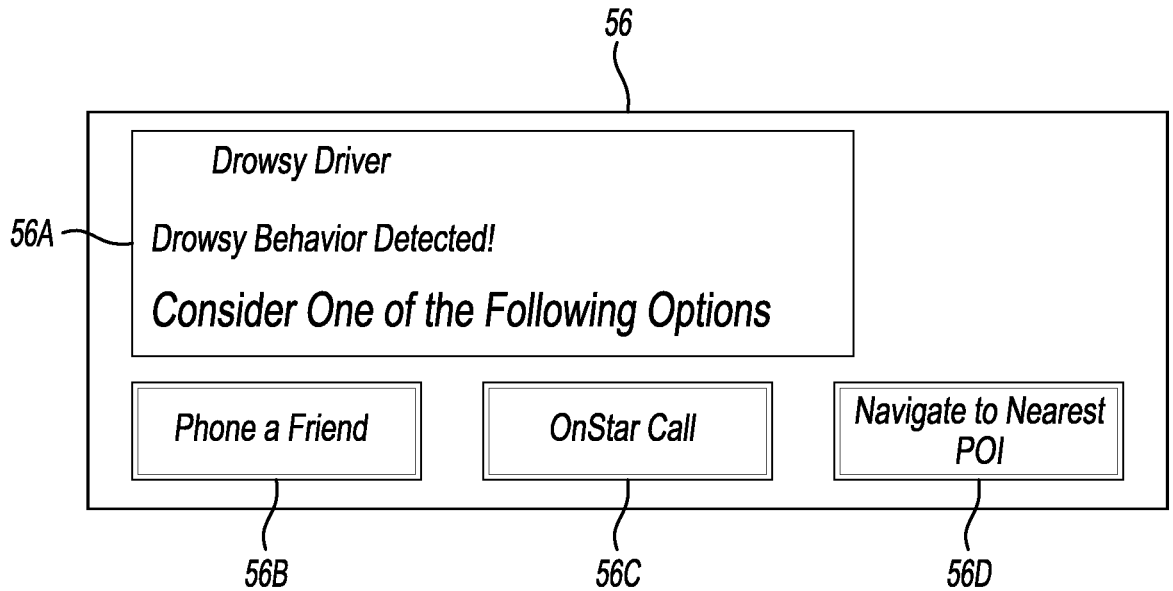
FIG. 3A is one example of a drowsiness mitigation message provided by the operator drowsiness alert system 10.
Figure 3B:
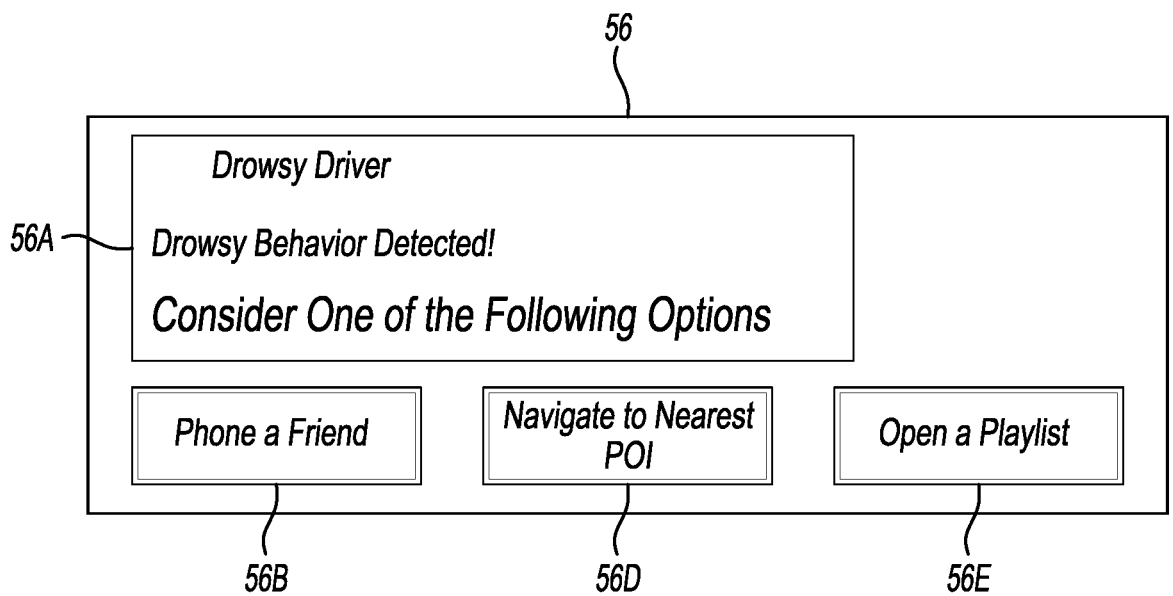
FIG. 3B is another example of a drowsiness mitigation message provided by the operator drowsiness alert system 10.

Also when in Alert Level 4 150, a driver drowsiness mitigation countermeasure may be provided by the system, given that the driver is viewed at this alert level to be at a very high state of drowsiness. Such a countermeasure may be provided after an alert is provided while in Alert Level 4 150. With reference to FIGS. 3A and 3B such a countermeasure may be, for instance, displaying a message 56A on driver information center 56 such as "Drowsy Behavior Detected! Consider One of the Following Options", while displaying operator-actuable buttons for "Phone a Friend" 56B, "OnStar Call" 56C, Navigate to Nearest POI" 56D, or "Open a Playlist" 56E. "Phone a Friend" 56B may offer via the driver information center 56 to place a call so that the driver may talk with someone (e.g., a contact in the driver's mobile phone) to stay awake. "Open a Playlist" 56E may offer for the vehicle to play music for the driver. "OnStar Call" 56C may offer to initiate a discussion with a telematics customer service representative. The latter countermeasure may be available if the vehicle is equipped with a subscription to a proprietary telematics system, such as those available from several automakers. "Navigate to Nearest POI" 56D may offer to provide a navigation route to a preferably-nearby point of interest ("POI"), such as a restaurant, a rest stop, a gas station, a coffee shop, or a hotel, where the driver may get respite from her or his drowsiness. The above mitigation countermeasures would be intended to help the driver stay awake and alert.

As an alternative to offering the countermeasures via driver information center 56, the system may offer the countermeasures via voice prompt and the driver may reply via voice command, if the vehicle is so equipped to provide voice prompts and receive voice commands.

As an alternative variation, as a countermeasure the system may automatically play music, place a phone call, or initiate a discussion with a telematics customer service representative, without requiring a command from the driver to do so.

Transition 144 from Alert Level 4 150 downward to Alert Level 3 140 occurs if the DDL is less than or equal to 7 for 30 seconds.

Transition 134 from Alert Level 3 140 downward to Alert Level 2 130 occurs if the DDL is less than or equal to 7 for 60 seconds.

Transition 124 from Alert Level 2 130 downward to Alert Level 1 120 occurs if the DDL is less than 7 for 120 seconds.

Transition 114 from Alert Level 1 120 to Alert Level 0 110 occurs if the DDL is less than 7 for 240 seconds.

As a variation on the present disclosure, the alerts provided in any of Alert Level 1 120, Alert Level 2 130, and/or Alert Level 3 140 may be suppressed if any of such Alert Levels is entered from a higher alert level (e.g., Alert Level 2 130 being entered from Alert Level 3 140 via state transition 134). That is, while the conditions for providing an alert may otherwise be met, the alert is suppressed (in other words, not provided). This is to help limit undue potential driver annoyance, given that the severity of the driver's drowsiness is generally decreasing, and an alert may not be needed. However, the system preferably continues to manage the state transitions according to state transition diagram 100 so that the system continues to track the driver's drowsiness and therefore remains able to provide respective alerts and drowsiness mitigation countermeasures as appropriate.

As a further variation on the present disclosure, the alerts provided in any of Alert Level 1 120, Alert Level 2 130, Alert Level 3 140 and/or Alert Level 4 150 may be suppressed under certain circumstances that cast doubt on whether the driver of the vehicle is actually drowsy or on the extent of the driver's drowsiness. For example, if brake pedal position sensor 34 indicates that the vehicle's brake pedal is being actuated at a frequency or in a manner which suggests that the driver may not be very drowsy and/or has active control of the vehicle, alerts may be suppressed. As another example, if accelerator pedal sensor 32 indicates that the vehicle's accelerator pedal is being actuated at a frequency or in a manner which suggests that the driver may not be very drowsy and/or has active control of the vehicle, alerts may be suppressed. As a further example, if the lateral acceleration of the vehicle, as measured by lateral accelerometer 36 suggests that the driver is not very drowsy and/or is actively in control of the vehicle, alerts may be suppressed. As yet another example, if longitudinal acceleration of the vehicle, as measured by changes in vehicle speed or by longitudinal acceleration sensor 38, suggests that the driver is not very drowsy and/or is actively in control of the vehicle, alerts may be suppressed. As still another example, if the vehicle has been powered on, the engine started and/or the vehicle operated (i.e., driven, in the case of a motor vehicle) for less than a predetermined period of time, alerts may be suppressed, given that the driver is less likely to be very drowsy if she or he has just begun operating the vehicle. In each case described in this paragraph, alerts will be suppressed even if conditions otherwise described in this disclosure would cause alerts to be provided. Such suppression may avoid driver annoyance with unnecessary "false alarms" from the system. Such "false alarms" may cause the driver to manually turn off the driver drowsiness alert system altogether, defeating the benefit of having such a system on the vehicle. However, again, the state transitions illustrated in FIG. 2 may continue, with alerts simply being suppressed.

The times associated with the various state transitions 112, 114, 122, 124, 132, 134, 142 and 144 and with the various alert wait and repetition times described with reference to Alert Levels 120, 130, 140, and 150 are purely exemplary of the teachings of this disclosure and may be suitably modified by the vehicle system designers and calibrators who may implement these teachings.

As an alternative example, the drowsiness alert system may contain a switch or other input that allows the operator to elect to turn off the system or suppress alerts, although the vehicle is otherwise operating. Or, alternatively, the operator may elect to turn off the system or suppress alerts for, say, a predetermined time or until the vehicle is next powered on. The ability to turn off the system or suppress alerts may, in another example, not be available if the vehicle senses, via use of a special key used by the driver or otherwise, that a teen driver or a driver below a predetermined age is driving.

A feature of the system disclosed herein is that it is scalable to fit the particular requirements of the system designer for a particular vehicle. The system may, for instance, have four Alert States in which alerts may be provided (here, Alert State 1 120, Alert State 2 130, Alert State 3 140 and Alert State 4 150). However, the system may have fewer or more.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling an operator drowsiness alert system for a vehicle, the method reacting to a sensed or calculated level of drowsiness of an operator of the vehicle, the method comprising:

entering a first drowsiness alert state associated with a first operator drowsiness alert if the sensed or calculated level of drowsiness is above a first predetermined level for a first predetermined time, wherein the first predetermined time is greater than zero;

transitioning from the first drowsiness alert state to a second drowsiness alert state associated with a second operator drowsiness alert if the sensed or calculated level of drowsiness is above a second predetermined level for a second predetermined time, wherein the second predetermined time is greater than zero;

providing the first operator drowsiness alert after a predetermined time in the first drowsiness alert state, the predetermined time in the first drowsiness alert state being greater than zero;

while in the second drowsiness alert state, moving to the first drowsiness alert state if the sensed or calculated level of drowsiness is below a predetermined level for a predetermined period of time; and suppressing the first operator drowsiness alert if the first drowsiness alert state was entered from the second drowsiness alert state.

2. The method of claim 1, further comprising repeating the first operator drowsiness alert if the system remains in the first drowsiness alert state for more than an additional predetermined time, the additional predetermined time in the first drowsiness alert state being greater than zero.

3. The method of claim 1, further comprising:

providing the second operator drowsiness alert after a predetermined time in the second drowsiness alert state, the predetermined time in the second drowsiness alert state being greater than zero.

4. The method of claim 1, wherein:

notwithstanding any other conditions being met for providing the first operator drowsiness alert, the first operator drowsiness alert is suppressed until expiration of an alert suppression time, the alert suppression time being a predetermined time after one or more of the operator powering up the vehicle, the vehicle being started, and the operator beginning to operate the vehicle.

5. The method of claim 1, wherein:

notwithstanding any other conditions being met for providing the first operator drowsiness alert, the first operator drowsiness alert is suppressed based on one or more of operator brake pedal actuation, operator accelerator pedal actuation, vehicle longitudinal acceleration, and vehicle lateral acceleration.

6. The method of claim 3, further comprising providing an operator drowsiness mitigation while in the second drowsiness alert state.

7. The method of claim 6 wherein the operator drowsiness mitigation is provided after the second operator drowsiness alert.

8. The method of claim 7, wherein the operator drowsiness mitigation includes a textual message on a driver information center of the vehicle or an audible voice message.

9. The method of claim 8, wherein the message offers the operator one or more of making a telephone call, playing music, beginning a conversation with a telematics service representative, and navigating to a point of interest.

10. The method of claim 3, further comprising:
if the operator is not below a predetermined age, allowing the operator to elect to turn off the system and/or suppress alerts, although the vehicle is otherwise operating.

11. An operator drowsiness alert system for a vehicle, the system comprising:
one or more controllers collectively programmed with the following instructions:
enter a first drowsiness alert state associated with a first operator drowsiness alert if a sensed or calculated level of drowsiness of a vehicle operator is above a first predetermined level for a first predetermined time, wherein the first predetermined time is greater than zero;
transition from the first drowsiness alert state to a second drowsiness alert state associated with a second operator drowsiness alert if the sensed or calculated level of drowsiness is above a second predetermined level for a second predetermined time, wherein the second predetermined time is greater than zero;
provide the first operator drowsiness alert after a predetermined time in the first drowsiness alert state, the predetermined time in the first drowsiness alert state being greater than zero;
while in the second drowsiness alert state, move to the first drowsiness alert state if the sensed or detected level of drowsiness is below a predetermined level for a predetermined time; and
suppress the first drowsiness alert if the first drowsiness alert state was entered from the second drowsiness alert state.

12. The operator drowsiness alert system of claim 11, wherein the one or more controllers are further collectively programmed with the following instruction:
notwithstanding any other conditions being met for providing the first operator drowsiness alert, suppress the alert for an alert suppression time, the alert suppression time being a predetermined time after one or more of the vehicle operator powering up the vehicle, the vehicle being started, and the vehicle operator beginning to operate the vehicle.

13. The operator drowsiness alert system of claim 11, wherein the one or more controllers are further collectively programmed with the following instruction:
notwithstanding any other conditions being met for providing the first operator drowsiness alert, suppress the first operator drowsiness alert based one or more of operator brake pedal actuation, operator accelerator pedal actuation, vehicle longitudinal acceleration and vehicle lateral acceleration.

14. The operator drowsiness alert system of claim 11, wherein the one or more controllers are further collectively programmed with the following instruction:
provide an operator drowsiness mitigation while in the second drowsiness alert state, wherein the mitigation includes a textual message on a driver information center of the vehicle or an audible voice message, wherein the textual message or audible voice message offers the operator one or more of making a telephone call, playing music, beginning a conversation with a telematics service representative, and navigating to a point of interest.

15. The operator drowsiness alert system of claim 14, wherein the operator drowsiness mitigation is provided after the second operator drowsiness alert.

16. The operator drowsiness alert system of claim 15, wherein the operator drowsiness mitigation includes a textual message on a driver information center of the vehicle.

17. The operator drowsiness alert system of claim 15, wherein the operator drowsiness mitigation includes an audible voice message.

18. The operator drowsiness alert system of claim 16, wherein the message offers the operator one or more of making a telephone call, playing music, beginning a conversation with a telematics service provider, and navigating to a point of interest.

19. The operator drowsiness alert system of claim 17, wherein the message offers the operator one or more of making a telephone call, playing music, beginning a conversation with a telematics service provider, and navigating to a point of interest.

20. A method for controlling an operator drowsiness alert system for a vehicle, the method reacting to a sensed or calculated level of drowsiness of an operator of a vehicle, the method comprising:
through one or more controllers, entering a first drowsiness alert state associated with a first operator drowsiness alert if the sensed or calculated level of drowsiness is above a first predetermined level for a first predetermined time, wherein the first predetermined time is greater than zero;
through the one or more controllers, transitioning from the first drowsiness alert state to a second drowsiness alert state associated with a second operator drowsiness alert if the sensed or calculated level of drowsiness is above a second predetermined level for a second predetermined time;
through the one or more controllers, providing the first operator drowsiness alert after a predetermined time in the first drowsiness alert state, the predetermined time in the first drowsiness alert state being greater than zero;
through the one or more controllers and while in the second drowsiness alert state, moving to the first drowsiness alert state if the sensed or calculated level of drowsiness is below a predetermined level for a predetermined period of time; and
through the one or more controllers, suppressing the first operator drowsiness alert if the first drowsiness alert state was entered from the second drowsiness alert state.

* * * * *